United States Patent [19]

Corbacho

[11] 4,379,562
[45] Apr. 12, 1983

[54] INDEXING APPARATUS
[75] Inventor: Carlos J. Corbacho, Newark, N.J.
[73] Assignee: Joyal Products, Inc., Linden, N.J.
[21] Appl. No.: 222,558
[22] Filed: Jan. 5, 1981
[51] Int. Cl.$^3$ .............................................. B23Q 3/08
[52] U.S. Cl. ....................................... 279/5; 409/221
[58] Field of Search .............................. 279/5; 409/221
[56] References Cited

U.S. PATENT DOCUMENTS

| | | | |
|---|---|---|---|
| 2,704,672 | 3/1955 | Wiltsie et al. | 279/5 |
| 3,055,671 | 9/1962 | Lewis et al. | 279/5 |
| 3,090,633 | 5/1963 | Farnsworth | 279/5 |
| 3,156,037 | 11/1964 | Warner | 29/54.5 |
| 3,273,907 | 9/1966 | Voderberg et al. | 279/5 |
| 3,441,707 | 4/1969 | Warner | 219/103 |
| 3,451,685 | 6/1969 | Butler | 279/5 |
| 3,456,091 | 7/1969 | Warner | 219/103 |
| 3,533,615 | 10/1970 | Schneider | 279/5 |
| 3,901,519 | 8/1975 | Lecailtel et al. | 279/5 |

Primary Examiner—Robert E. Garrett
Assistant Examiner—Paul M. Heyrana
Attorney, Agent, or Firm—Lerner, David, Littenberg & Samuel

[57] ABSTRACT

An indexing machine utilizes a rotating assembly for incrementally rotating a workpiece which is releasably held by a gripping mechanism adapted to rotate conjointly with the rotating assembly. The gripping mechanism is movable between a first position in which the gripping mechanism grips the workpiece and a second position in which the gripping mechanism releases the workpiece. The gripping mechanism is automatically and constantly urged towards its second position so as to facilitate the release of the workpiece from the gripping mechanism. Indexing plates, which determine the increments of rotation of the rotating assembly, are positioned at one end of the rotating assembly so that they may be quickly and easily removed. The rotating assembly includes a first member and a second member, which is mounted for reciprocating movement relative to the first member. A locking device releasably locks the second member to the first member so that the second member can rotate conjointly with the first member. When the second member is unlocked from the first member, the second member can be rotated relative to the first member.

9 Claims, 5 Drawing Figures

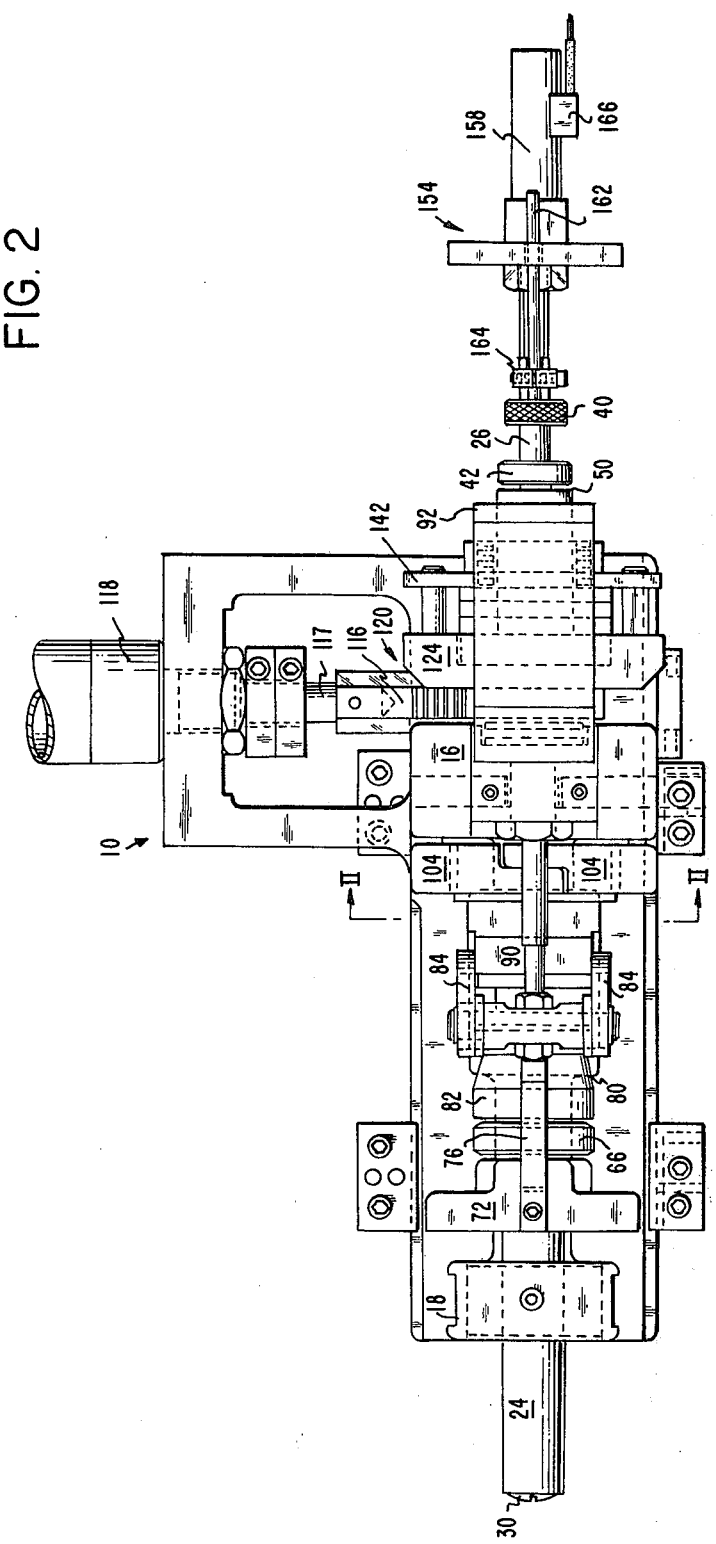

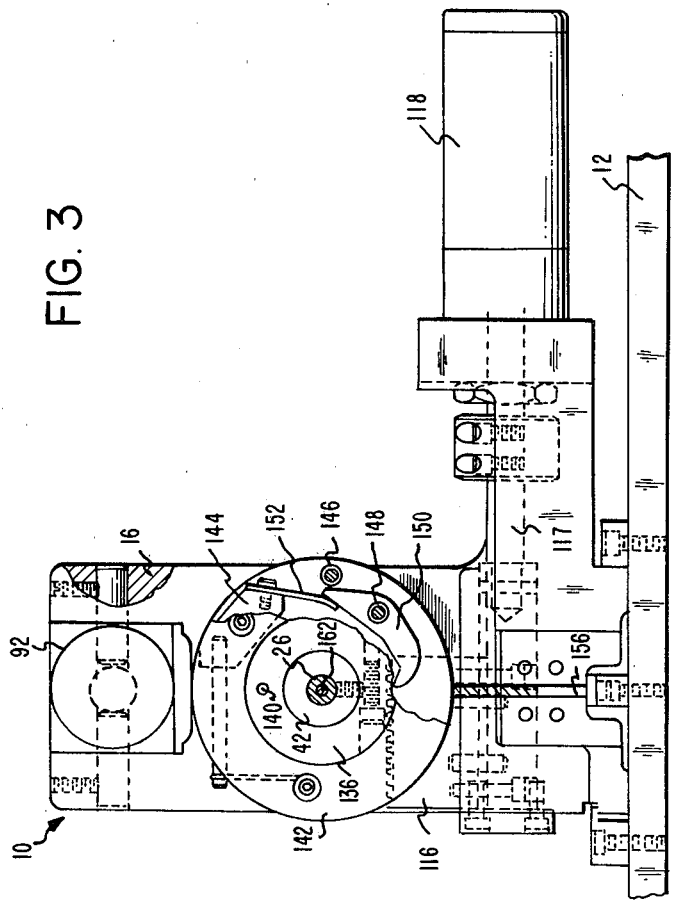

INDEXING APPARATUS

FIELD OF THE INVENTION

The present invention relates to indexing machines, and, more particularly, to such machines which are especially adapted to incrementally rotate a workpiece. These machines are commonly used in connection with the fusing or spot welding of electric motor armature wires to commutator bars, wherein an armature is rotated in increments to successively position the commutator bars at a predetermined work station.

BACKGROUND OF THE INVENTION

Indexing machines have been in existence for many years. In Warner U.S. Pat. No. 3,156,037, there is disclosed an indexing machine which has been marketed successfully for a number of years by the assignee of the present invention. Despite the commercial success of the indexing machine of the Warner patent, the machine has room for improvement. For instance, the prior indexing machine employs a ratchet mechanism to control the increments of rotation of a rotatable work support assembly. Because the ratchet mechanism is positioned intermediate the ends of the work support assembly, the work support assembly must be substantially disassembled in order to remove the ratchet mechanism for replacement purposes. Accordingly, ratchet mechanism replacement operations can be time-consuming and costly, due to machine downtime.

In the prior indexing machine, a chuck is utilized to releasably clamp one end of an armature shaft. The chuck is moved by a pneumatic cylinder between a closed position in which the chuck grips the armature shaft and an open position in which the chuck releases the armature shaft. It has been found that the pneumatic cylinder sometimes fails to completely move the chuck from its closed position to its open position, thereby preventing the removal of the armature shaft from the chuck without manual assistance.

SUMMARY OF THE INVENTION

The present invention overcomes many of the problems and shortcomings described above by providing a new and improved indexing apparatus which normally includes rotating means for incrementally rotating a workpiece, such as an armature, to be indexed, gripping means for gripping the workpiece when the gripping means is in a first position and for releasing the workpiece when the gripping means is in a second position, and moving means for moving the gripping means between its first and second positions. In accordance with one aspect of the present invention, urging means is employed for automatically and constantly urging the gripping means towards its second position, thereby facilitating the movement of the gripping means from its first position to its second position and hence the release of the workpiece from the gripping means. In one embodiment, the urging means includes a resilient member, such as a coil spring.

Another aspect of the present invention involves positioning a plurality of ratchet plates at one end of the rotating means. Such positioning of the ratchet plates, which determine the increments of rotation of the rotating means, facilitates their removal for replacement purposes, thereby reducing machine downtime.

In one embodiment of the present invention, the rotating means includes a first member and a second member, which is mounted for reciprocating and rotating movement within the first member and adapted to threadedly receive the gripping means so that the reciprocating movement of the second member relative to the first member will result in the movement of the gripping means between its first and second positions. Locking means releasably locks the second member to the first member in such a manner that the second member can be rotated conjointly with the first member. Connecting means connects the reciprocating means to the second member such that the second member is rotatable relative to the first member, whereby the second member can be rotated to threadedly receive the gripping means without having to rotate the gripping means.

BRIEF DESCRIPTION OF THE DRAWINGS

For a more complete understanding of the present invention, reference may be had to the following description of an exemplary embodiment taken in conjunction with the accompanying figures of the drawings, in which:

FIG. 2 is a top view of the indexing apparatus shown in FIG. 1;

FIG. 3 is a cross-sectional view, taken along line I—I in FIG. 1 and looking in the direction of the arrows, of the indexing apparatus of FIG. 1, portions of the apparatus being broken away to facilitate consideration and discussion;

DESCRIPTION OF AN EXEMPLARY EMBODIMENT

Figure 1:
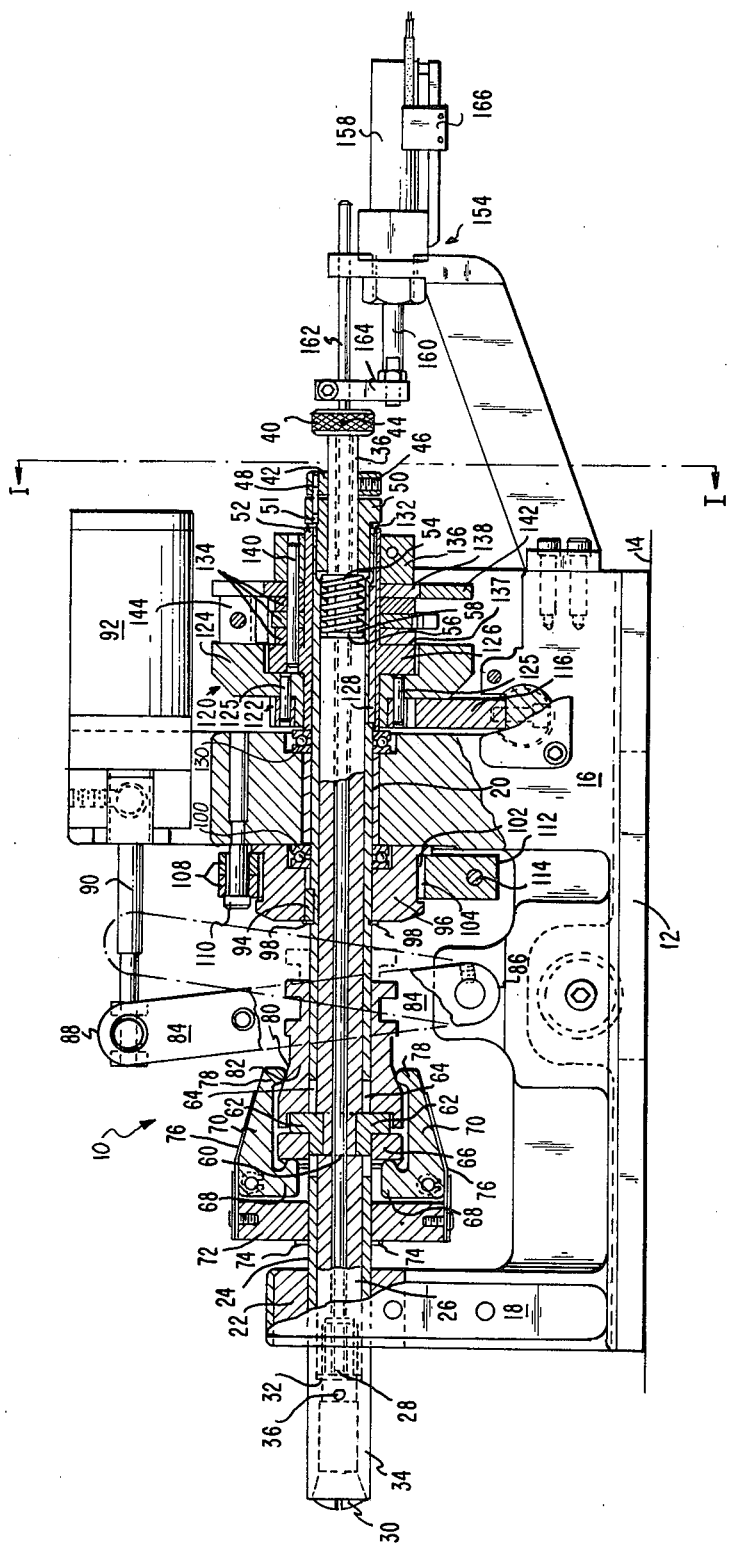
FIG. 1 is a partial cross-sectional view of an exemplary embodiment of an indexing apparatus constructed in accordance with the present invention.
Figure 5:
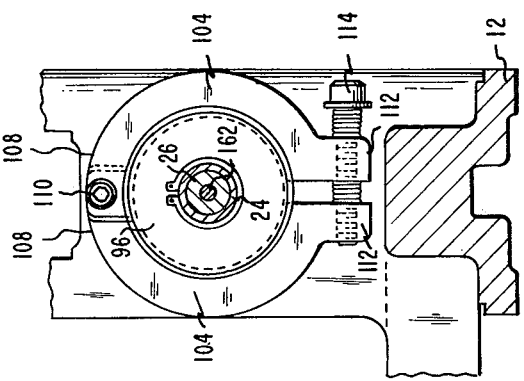
FIG. 5 is a cross-sectional view, taken along line II—II in FIG. 2 and looking in the direction of the arrows, of the indexing apparatus of FIG. 2.
Figure 4:
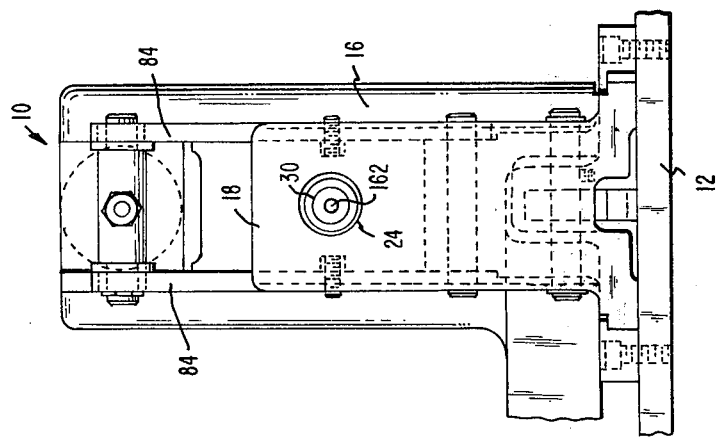
FIG. 4 is a front elevational view of the indexing apparatus illustrated in FIG. 1.

Referring to FIGS. 1-5, there is shown an indexing apparatus 10 having a housing 12 which is mounted on a supporting surface 14, such as a table. The housing 12 has a main support 16 and an auxiliary support 18. The main support 16 and the auxiliary support 18 are provided with anti-friction busings 20, 22, respectively, for rotatably supporting a spindle 24. A tubular drawbar 26, having a longitudinal bore 28 extending therethrough, is mounted for reciprocating and rotating movement within the spindle 24. A collet 30 is threadedly received in a leading end 32 of the drawbar 26 and keyed to a leading end 34 of the spindle 24 by a pin 36 such that the collet 30 is free to move axially relative to the spindle 24 but is prevented from rotating relative to the spindle 24. A trailing end 38 of the drawbar 26, which has a smaller diameter than the rest of the drawbar 26, includes a turning knob 40 and a locking ring 42 which are releasably attached to the drawbar 26 by set screws 44, 46, respectively. The locking ring 42 removably receives one end of a pin 48. A locking nut 50, which has an aperture 51 sized to slidably receive the other end of the pin 48, is threadedly received in a trailing end 52 of the spindle 24. The locking ring 42, the pin 48, and the locking nut 50 cooperate to lock the drawbar 26 to the spindle 24 in such a manner that the drawbar 26 is prevented from rotating relative to the spindle 24 but is free to move axially relative to the spindle 24. A coil spring 54 is interposed between the locking nut 50 and a thrust washer 56 disposed against a shoulder 58 formed where the trailing end 38 of the drawbar 26 merges with the rest of the drawbar 26, whereby the drawbar 26 and the collet 30 are urged toward the leading end 34 of the spindle 24. The drawbar 26 also has a circumferential slot 60 which slidably receives a plurality of locking fingers 62.

The spindle 24 includes a plurality of slots 64. Each of the slots 64 receives a corresponding one of the locking fingers 62. A collar 66 is disposed about the spindle 24 to maintain the locking fingers 62 in the circumferential slot 60 of the drawbar 26. The collar 66 is engaged by pushing portions 68 of a pair of clutch fingers 70, each of which is pivotally mounted to a yoke 72 movably received on the spindle 24. Stops 74 on the spindle 24 limit the movement of the collar 66 toward the leading end 34 of the spindle 24. A pair of leaf springs 76 is suspended from the yoke 72. Each of the leaf springs 76 urges a cam follower portion 78 of a corresponding one of the clutch fingers 70 against a cam surface 80 of a clutch cam 82, which is movably received on the spindle 24. The clutch cam 82 is attached to a pair of arms 84, each of which is pivotally attached at a lower end 86 to the housing 12 and at an upper end 88 to a piston rod 90 of a pneumatic cylinder 92. The pneumatic cylinder 92 is pivotally attached to the main support 16 of the housing 12.

A key 94 attaches a brake drum 96 to the spindle 24 between stops 98 and a thrust bearing 100, which abuts the main support 16 of the housing 12. An annular groove 102 formed in the brake drum 96 receives a pair of semi-circular brake bands 104 (see FIG. 5), each of which has an upper end 108 that is pivotally attached to the main support 16 of the housing 12 by a pivot pin 110 and a lower end 112. The lower ends 112 of the brake bands 104 are connected to each other by a bolt and spring assembly 114 which can be adjusted to vary the pressure exerted by the brake bands 104 on the brake drum 96 and hence the spindle 24. By varying the pressure exerted on the spindle 24 by the brake drum 96, the rotation of the spindle 24 may be retarded to insure the accuracy of the indexing apparatus 10.

A rack 116 is mounted on the housing 12 for reciprocating movement transversely of the spindle 24 by a piston rod 117 of a pneumatic cylinder 118 (see FIG. 2). The rack 116 meshes with a gear assembly 120 which includes a pinion 122 and a mounting ring 124 that is attached to the pinion 122 by pins 125. The gear assembly 120 is rotatably carried by a ratchet adaptor 126, which is attached to the spindle 24 by a key 128 so that the ratchet adaptor 126 rotates conjointly with the spindle 24. The ratchet adaptor 126 is sandwiched by the locking nut 50 between a thrust bearing 130, which engages the main support 16 of the housing 12, and a spring washer 132. The ratchet adaptor 126 carries three ratchet plates 134, each of which includes a set of teeth (not shown). A lock nut 136, which is threadedly attached to the ratchet adaptor 126, sandwiches the ratchet plates 134 between a shoulder 137 formed on the ratchet adaptor 126 and a spacer bushing 138. The ratchet plates 134 are attached to the ratchet adaptor 126 by a pin 140 so that the ratchet plates 134 rotate conjointly with the ratchet adaptor 126 and hence the spindle 24. An indexing support 142 is disposed about the spacer bushing 138 and spaced from the gear assembly 120. With particular reference to FIG. 3, a pawl spring holder 144, a pawl locator 146, and a pawl mount 148 bridge the gap between the indexing support 142 and the gear assembly 120. A pawl 150 is pivotally attached to the pawl mount 148. The pawl 150 is urged into engagement with the teeth of a selected one of the ratchet plates 134 by a leaf spring 152, which is suspended from the pawl spring holder 144. The pawl locator 146 determines which of the ratchet plates 134 will be engaged by the pawl 150.

An ejector assembly 154 is attached to the housing 12 by a mounting bracket 156, which carries a pneumatic cylinder 158. The pneumatic cylinder 158 has a piston rod 160 which is clamped to an ejection rod 162 by a saddle clamp 164. The ejection rod 162, which extends into the collet 30, is mounted in the bore 28 of the drawbar 26 for reciprocating movement in response to the movement of the piston rod 160. A control switch 166 is mounted to the pneumatic cylinder 158. The switch 166 generates a signal in response to the movement of the ejection rod 162 away from the leading end 34 of the spindle 24 to actuate a programmer (not shown) which controls the operation of a machine (not shown), such as a fuser or spot welder, used in combination with indexing apparatus 10.

In operation, a workpiece, such as an armature shaft, is inserted into the collet 30, which is in an open position. The insertion of the workpiece causes the ejection rod 162 to be moved away from the leading end 34 of the spindle 24, thereby causing the retraction of the piston rod 160 of the pneumatic cylinder 158 and hence the generation of a signal by the switch 166 to actuate the programmer (not shown) and initiate a machine cycle, including the actuation of the pneumatic cylinder 92. Upon actuation of the pneumatic cylinder 92, the piston rod 90 is retracted, resulting in the pivoting of the arms 84 to the position indicated in phantom in FIG. 1. Such pivoting movement of the arms 84 results in the sliding movement of the clutch cam 82 toward the trailing end 52 of the spindle 24. As the clutch cam 82 slides along the spindle 24, the cam follower portions 78 of the clutch fingers 70 ride along the cam surface 80 of the clutch cam 82, resulting in the pivotal movement of the clutch fingers 70 such that the pushing portions 68 of the clutch fingers 70 urge the collar 66, the locking fingers 62, the drawbar 26, and the collet 30 toward the trailing end 52 of the spindle 24. During such movement of the collet 30, the collet 30 cooperates with the leading end 34 of the spindle 24 to cause the collet to assume a closed position in which the workpiece is gripped by the collet 30.

After the collet 30 grips the workpiece, the piston rod 117 of the pneumatic cylinder 118 is retracted to move the rack 116 a predetermined adjustable distance, resulting in the rotation of the gear assembly 120, the pawl mount 148, and the pawl 150 relative to the spindle 24. During such rotation of the pawl 150, the pawl 150 skips over the teeth of a selected one of the ratchet plates 134. When the rotation of the pawl 150 has terminated, the leaf spring 152 urges the pawl 150 into proper meshing engagement with a tooth of the selected one of the ratchet plates 134. Next, the piston rod 117 is extended causing the reverse rotation of the pawl 150 and hence the corresponding rotation of the ratchet plates 134, the ratchet adaptor 126, the spindle 24, the drawbar 26, the collet 30, and the workpiece. The distance or increment of this reverse rotation is determined by the spacing between the teeth of the ratchet plates 134 and the amount of movement of the rack 116.

After a predetermined number of indexing operations are performed, the piston rod 90 of the pneumatic cylinder 92 is extended, thereby moving the clutch cam 82, the locking fingers 62, the drawbar 26, and the collet 30 away from the trailing end 52 of the spindle 24. Such movement of the collet 30, which movement is facilitated by the coil spring 54, causes the collet 30 to assume its open position, thereby releasing the workpiece. Once the collet 30 releases the workpiece, the piston rod 160 of the pneumatic cylinder 158 is extended to move the ejection rod 162 toward the leading end 134 of the spindle 24, whereby the ejection rod 162 contacts the workpiece and forces it out of the collet 30.

If it is necessary to replace the ratchet plates 134, they can be removed quickly and easily by first removing the lock nut 136 and the spacer bushing 138 from the ratchet adaptor 126. After the removal of the lock nut 136 and the spacer bushing 138, the ratchet plates 134 are slid off of the pin 140.

The collet 30 is threadedly attached to the drawbar 26 so that the collet can be removed and replaced to accommodate different size workpieces. The collet 30 can be removed simply by detatching the locking ring 42 from the locking nut 50 and hence the spindle 24, so that upon rotation of the turning knob 40 the drawbar 26 rotates relative to the spindle 24 and hence the collet 30.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What I claim is:

1. Indexing apparatus, comprising rotating means for incrementally rotating a workpiece to be indexed, said rotating means including a first end, a second end, a first tubular member, a second tubular member mounted for reciprocating and rotating movement within said first tubular member, gripping means threadedly attached to said second tubular member at said first end of said rotating means and keyed to said first tubular member such that said gripping means is free to move axially relative to said first tubular member but is prevented from rotating relative to said first tublar member, said gripping means being movable in response to the axial position of said second tubular member relative to said first tubular member between a first position in which said gripping means grips the workpiece to be indexed and a second position in which said gripping means releases a workpiece after it has been indexed, locking means for releasably locking said first tublar member to said second tubular member such that said second tubular member is rotatable conjointly with said first tubular member, and determining means for determining the increments of rotation of said rotating means, said determining means being removably positioned adjacent to said second end of said rotating means to facilitate the removal of said determining means for replacement purposes; moving means positioned between said gripping means and said determining means for moving said gripping means between said first position and said second position in response to the axial position of said second tubular member relative to said first tubular member, said moving means including reciprocating means for axially reciprocating said second tubular member within said first tubular member and connecting means for connecting said reciprocating means to said second tubular member such that said second tubular member is rotatable about its longitudinal axis relative to said first tubular member when said second tubular member is not locked to said first tubular member, whereby said second tubular member can be rotated relative to said first tubular member and hence said gripping means when said second tubular member is not locked to said first tubular member to thereby threadedly detach said gripping means from said second tubular member for replacement purposes.

2. Indexing apparatus according to claim 1, wherein said determining means includes a plurality of ratchet plates disposed coaxially about said first tubular member and attached to said first tubular member for conjoint rotation therewith, each of said ratchet plates including a set of teeth; engaging means for releasably engaging said teeth of said ratchet plates; and mounting means for mounting said engaging means such that said engaging means may be selectively engaged with any one of said ratchet plates.

3. Indexing apparatus according to claim 2, wherein said locking means is positioned at said second end of said rotating means such that said determining means is between said locking means and said gripping means, said locking means being sized and shaped such that said ratchet plates can be removed from said first tubular member by pulling them off of said second end of said rotating means without removing said locking means.

4. Indexing apparatus according to claim 3, wherein said locking means includes a first locking ring fixedly attached to said first tubular member, a second locking ring fixedly attached to said second tubular member and a pin, one end of which is removably received in a hole provided in said first locking ring and an opposite end which is removably received in a hole provided in said second locking ring.

5. Indexing apparatus according to claim 4, wherein said ratchet plates have an inner diameter which is greater than an outer diameter of said first and second locking rings, whereby said ratchet plates may pass over said first and second locking rings when being removed from said first tubular member.

6. Indexing apparatus according to claim 1 or 5, wherein said connecting means includes a collar coaxially and movably disposed about said first tubular member, a circumferential groove provided in said second tubular member, a plurality of slots provided in said first tubular member, a plurality of contact members positioned in abutting engagement with said collar, each of said contact members being slidably received in said groove and extending through a corresponding one of said slots, and urging means for urging said collar into abutting engagement with said contact members.

7. Indexing apparatus according to claim 1, further comprising urging means for automatically and constantly urging said gripping means towards said second position, whereby said urging means assists said moving means in moving said gripping means from said first position to said second position.

8. Indexing apparatus according to claim 7, wherein said urging means includes a coil spring interposed between said first and second tubular members.

9. Indexing apparatus according to claim 1, wherein said gripping means includes a collet.

* * * * *